United States Patent
Davidson et al.

(10) Patent No.: US 11,652,398 B2
(45) Date of Patent: May 16, 2023

(54) VOLTAGE SOURCE CONVERTERS

(71) Applicant: GENERAL ELECTRIC TECHNOLOGY GMBH, Baden (CH)

(72) Inventors: Colin Charnock Davidson, Stafford (GB); Francisco Javier Chivite-Zabalza, Stafford (GB); John Lewis Outram, Stafford (GB); Jerome Gregoire, Stafford (GB)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 16/978,852

(22) PCT Filed: Mar. 5, 2019

(86) PCT No.: PCT/EP2019/055400
§ 371 (c)(1),
(2) Date: Sep. 8, 2020

(87) PCT Pub. No.: WO2019/170645
PCT Pub. Date: Sep. 12, 2019

(65) Prior Publication Data
US 2020/0412235 A1    Dec. 31, 2020

(51) Int. Cl.
*H02M 1/32* (2007.01)
*H02M 7/483* (2007.01)
(Continued)

(52) U.S. Cl.
CPC .......... *H02M 1/32* (2013.01); *H02M 1/0095* (2021.05); *H02M 7/4835* (2021.05); *H02M 7/4837* (2021.05); *H02M 7/539* (2013.01)

(58) Field of Classification Search
CPC .. H02M 7/483; H02M 7/4835; H02M 7/4837; H02M 7/539; H02M 1/32
See application file for complete search history.

(56) References Cited

U.S. PATENT DOCUMENTS

2010/0066174 A1    3/2010   Dommaschk et al.
2016/0036314 A1*   2/2016   Koyanagi ............. H02M 7/483
                                                      363/65
(Continued)

FOREIGN PATENT DOCUMENTS

WO    2017203865 A1    11/2017

OTHER PUBLICATIONS

Diane-Perle et al.: "Investigaton of the surge current capability of the body diode of SiC MOSFETs for HVDS Applications", European Conference on Power Electronics and Application, Sep. 5, 2016, pp. 1-10, XP032985165.

(Continued)

*Primary Examiner* — Jue Zhang
(74) *Attorney, Agent, or Firm* — Eversheds Sutherland (US) LLP

(57) ABSTRACT

The present disclosure relates to a voltage source converter (VSC) (300) comprising: a first MOSFET switching element (302) including a first body diode (306); a second MOSFET switching element (304) including a second body diode (308), the second MOSFET switching element (304) being connected in series with the first MOSFET switching element (302); a protection device (318) connected in parallel with the second MOSFET switching element (304); and a controller (312), wherein the controller (312) is configured, on detection of an overcurrent event, to: switch off the first MOSFET switching element (302); and switch off the second MOSFET switching element (304), thereby forcing current flowing in the VSC (300) following the overcurrent event to flow through the second body diode (308) rather than through conducting channels of the first and second MOSFET switching elements (302, 304).

9 Claims, 11 Drawing Sheets

(51) Int. Cl.
    *H02M 7/539*     (2006.01)
    *H02M 1/00*     (2006.01)

(56) References Cited

U.S. PATENT DOCUMENTS

| | | | | |
|---|---|---|---|---|
| 2016/0126827 | A1* | 5/2016 | Dong | H02M 1/32 |
| | | | | 363/50 |
| 2016/0365787 | A1* | 12/2016 | Geske | H02M 1/32 |
| 2017/0257022 | A1* | 9/2017 | Bryant | H02M 1/0095 |
| 2019/0131867 | A1* | 5/2019 | Ishii | H02M 7/4835 |

OTHER PUBLICATIONS

International Search Report of PCT/EP2019/055400 dated May 21, 2019.
European Search Report for Application No. 18161101.3 dated Aug. 21, 2018.

\* cited by examiner

VOLTAGE SOURCE CONVERTERS

CROSS-REFERENCE TO RELATED APPLICATIONS

This application is a U.S. National Stage Application under 35 U.S.C. 371 and claims the priority benefit of International Application No. PCT/EP2019/055400 filed Mar. 5, 2019, which claims priority to EP18161101.3, filed Mar. 9, 2018, which are both incorporated herein by reference.

FIELD OF THE INVENTION

The present disclosure relates to the field of voltage source converters (VSCs). In particular, the present disclosure relates to a VSC submodule for a modular multilevel converter with improved protection against overcurrent events such as DC terminal-terminal short circuits.

BACKGROUND

High voltage direct current (HVDC) power transmission is a cost-effective way of transmitting electrical power over long distances. In HVDC systems alternating current (AC) electrical power is converted to high voltage direct current (HVDC) for transmission over overhead or undersea cables to a destination. At the destination, the HVDC power is converted back to AC power for onward distribution to end-user sites via an electrical distribution network.

Modular multilevel converters (MMC) are commonly used for the conversion of power between AC and HVDC. MMCs are typically made up of a plurality of submodules of the kind illustrated in FIG. 1.

A typical submodule is shown generally at 100 in FIG. 1. The submodule 100 is a half-bridge submodule, and includes a first switching element, in the form of a first silicon insulated-gate bipolar transistor (IGBT) 102, connected in series with a second switching element, in the form of a second silicon IGBT 104.

A first freewheel diode 106 is connected in an inverse parallel configuration with the first IGBT 102, with its anode connected to an emitter of the first IGBT 102 and its cathode connected to a collector of the first IGBT 102.

A second freewheel diode 108 is connected in an inverse parallel configuration with the second IGBT 104, with its anode connected to an emitter of the second IGBT 104 and its cathode connected to a collector of the second IGBT 104.

The emitter of the first IGBT 102 is connected to the collector of the second IGBT 104.

The collector of the first IGBT 102 is connected to a positive terminal of an energy storage element such as a capacitor 110, whilst the emitter of the second IGBT 104 is connected to a negative terminal of the energy storage element 110.

The gates of the first and second IGBTs 102, 104 are connected to outputs of a controller 112, which is configured to generate control signals to switch the first and second IGBTs 102, 104 on and off in a predetermined sequence.

A typical MMC includes a plurality of submodules 100 for each phase of an AC supply. FIG. 2 is a schematic representation of an MMC 200 including a plurality of submodules 100a-1001. The MMC 200 of FIG. 2 is operative to convert a three phase AC input voltage at AC input terminals 210, 220, 230 into a HVDC output across positive and negative DC output terminals 240, 250.

MMCs of the kind illustrated in FIG. 2 are vulnerable to damage to the semiconductor devices of their submodules 100 in the event of an overcurrent condition such as a short circuit between the DC output terminals 240, 250. A short circuit between the DC output terminals 240, 250 when the IGBTs of the submodules 100a-1001 are turned off results in a large fault current flowing from the AC input though the freewheel diodes of the submodules 100b, 100a, 100h, 100g, which can damage the freewheel diodes of these submodules. This is illustrated schematically in FIG. 3, in which, for the sake of clarity, the freewheel diodes of the submodules 100b, 100a, 100h, 100g are represented as single diodes 260b, 260a, 260h and 260g respectively, and the fault current flowing through those freewheel diodes is represented by the arrows.

One way of addressing this problem is through the use of a protection thyristor, as shown at 118 in FIG. 1. The protection thyristor 118 is connected in an inverse parallel arrangement with the second switching element 104 of the submodule 100, with its anode connected to the emitter of the second IGBT 104 and its cathode connected to the collector of the second IGBT 104.

A gate terminal of the protection thyristor 118 is connected to an output of the controller 112 in order to receive a control signal to switch the protection thyristor 118 on in the event that an overcurrent condition such as short circuit between the DC output terminals 240, 250 is detected. With the protection thyristor 118 switched on the fault current arising from the short circuit between the DC output terminals 240, 250 is divided between the protection thyristor 118 and the second freewheel diode 108.

In the arrangement of FIG. 1 which uses IGBTs as the switching elements 102, 104 and associated freewheel diodes 106, 108 the protection thyristor 118 must be able to switch on at a very low anode-cathode voltage (of the order of 2-3 volts), which is the typical forward voltage drop of the second freewheel diode 108.

SUMMARY

According to a first aspect, the invention provides a voltage source converter (VSC), the VSC comprising: a first MOSFET switching element including a first body diode; a second MOSFET switching element including a second body diode, the second MOSFET switching element being connected in series with the first MOSFET switching element; a protection device connected in parallel with the second MOSFET switching element; and a controller, wherein the controller is configured, on detection of an overcurrent event, to: switch off the first MOSFET switching element; and switch off the second MOSFET switching element, thereby forcing current flowing in the VSC following the overcurrent event to flow through the second body diode rather than through conducting channels of the first and second MOSFET switching elements.

The arrangement of the first aspect of the invention protects the first and second MOSFET switching elements from damage resulting from an overcurrent event, as on detection of an overcurrent event the current flowing in the VSC is diverted away from the conducting channels of the first and second MOSFET switching elements into the second body diode.

The protection device may comprise a thyristor, and the controller may be configured to switch on the thyristor after switching off the second MOSFET switching element, such that the current initially flows through the second body diode before being commutated to flow substantially only through the thyristor.

This arrangement ensures that current is rapidly commutated from the second body diode to the protection thyristor.

Alternatively, the protection device may comprise a diode.

The protection device may comprise a press-pack housing.

The first and second MOSFET switching elements may comprise silicon carbide MOSFETs.

The second MOSFET switching element may comprise a plurality of series-connected MOSFETs. The first MOSFET switching element may also comprise a plurality of series-connected MOSFETS.

The VSC may be, for example, a VSC submodule for a modular multilevel converter.

A second aspect of the invention provides a modular multilevel converter including a VSC submodule, the VSC submodule including a VSC according to the first aspect.

A third aspect of the invention provides a method for controlling operation of a voltage source controller (VSC), wherein the VSC comprises: a first MOSFET switching element including a first body diode; a second MOSFET switching element including a second body diode, the second MOSFET switching element being connected in series with the first MOSFET switching element; a protection device connected in parallel with the second MOSFET switching element; and a controller, wherein the method comprises: detecting an overcurrent event and, in response to detection of the overcurrent event: switching off the first MOSFET switching element; and switching off the second MOSFET switching element, thereby forcing current flowing in the VSC following the overcurrent event to flow through the second body diode rather than through conducting channels of the first and second MOSFET switching elements.

The protection device may comprise a thyristor, and the method may comprise switching on the thyristor after switching off the second MOSFET switching element, such that the current initially flows through the second body diode before being commutated to flow substantially only through the thyristor.

Alternatively, the protection device may comprise a diode.

The protection device may comprise a press-pack housing.

The first and second MOSFET switching elements may comprise silicon carbide MOSFETs.

The second MOSFET switching element may comprise a plurality of series-connected MOSFETs.

A fourth aspect of the invention provides a controller for controlling the operation of a VSC, wherein the VSC comprises a first MOSFET switching element including a first body diode; a second MOSFET switching element including a second body diode, the second MOSFET switching element being connected in series with the first MOSFET switching element; and a protection device connected in parallel with the second MOSFET switching element, wherein the controller is configured to perform the steps of the method of the third aspect of the invention.

BRIEF DESCRIPTION OF THE DRAWINGS

Embodiments of the invention will now be described, strictly by way of example only, with reference to the accompanying drawings, of which.

DETAILED DESCRIPTION

Figure 4:
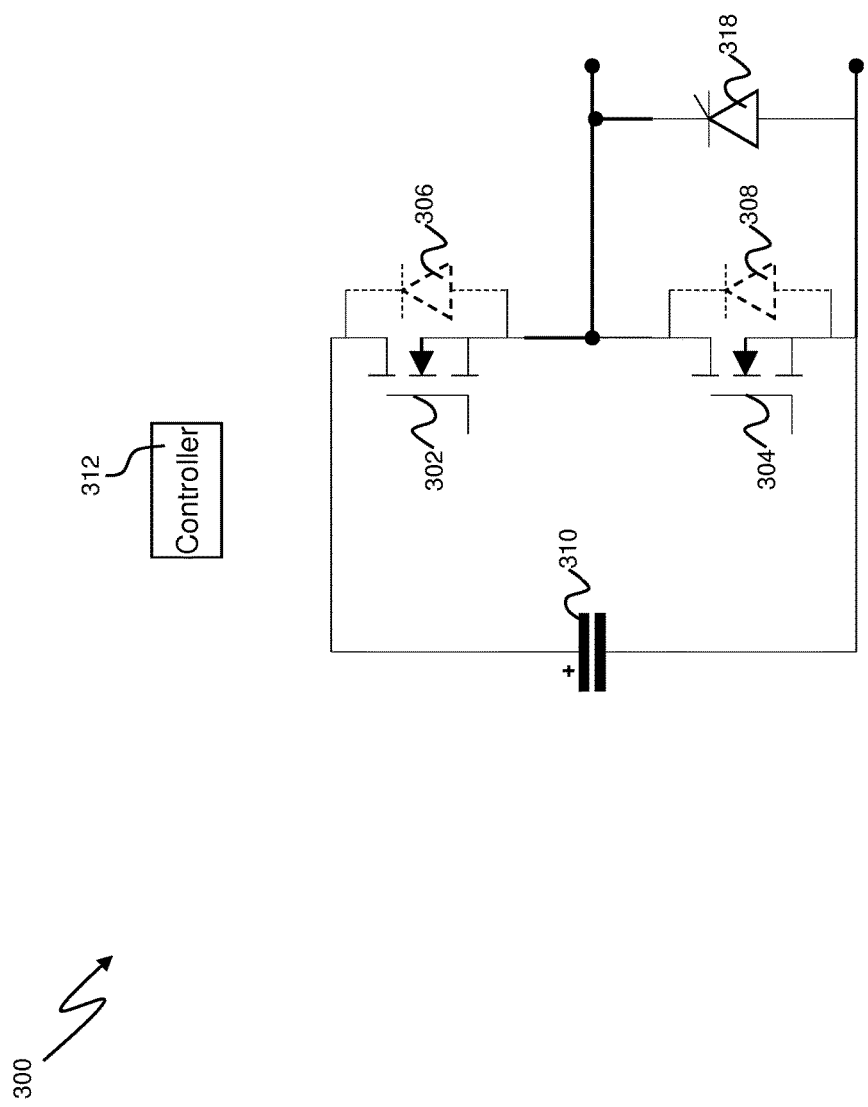
FIG. 4 is a schematic representation of a submodule of a modular multilevel converter which uses MOSFETs as switching elements.

Referring now to FIG. 4, a half-bridge submodule for a MMC is shown generally at 300, and includes a first switching element 302 connected in series with a second switching element 304. In the submodule 300 of FIG. 4 the first and second switching elements 302, 304 are MOSFET devices, for example silicon carbide MOSFET devices.

A source terminal of the first MOSFET 302 is connected to a drain terminal of the second MOSFET 304. A drain terminal of the MOSFET 302 is connected to a positive terminal of an energy storage element such as a capacitor 310, whilst a source terminal of the second MOSFET 304 is connected to a negative terminal of the energy storage element 310.

Gate terminals of the first and second MOSFETs 302, 304 are connected to outputs of a controller 312, which is configured to generate control signals to switch the first and second MOSFETs 302, 304 on and off in a predetermined sequence.

Figure 1:
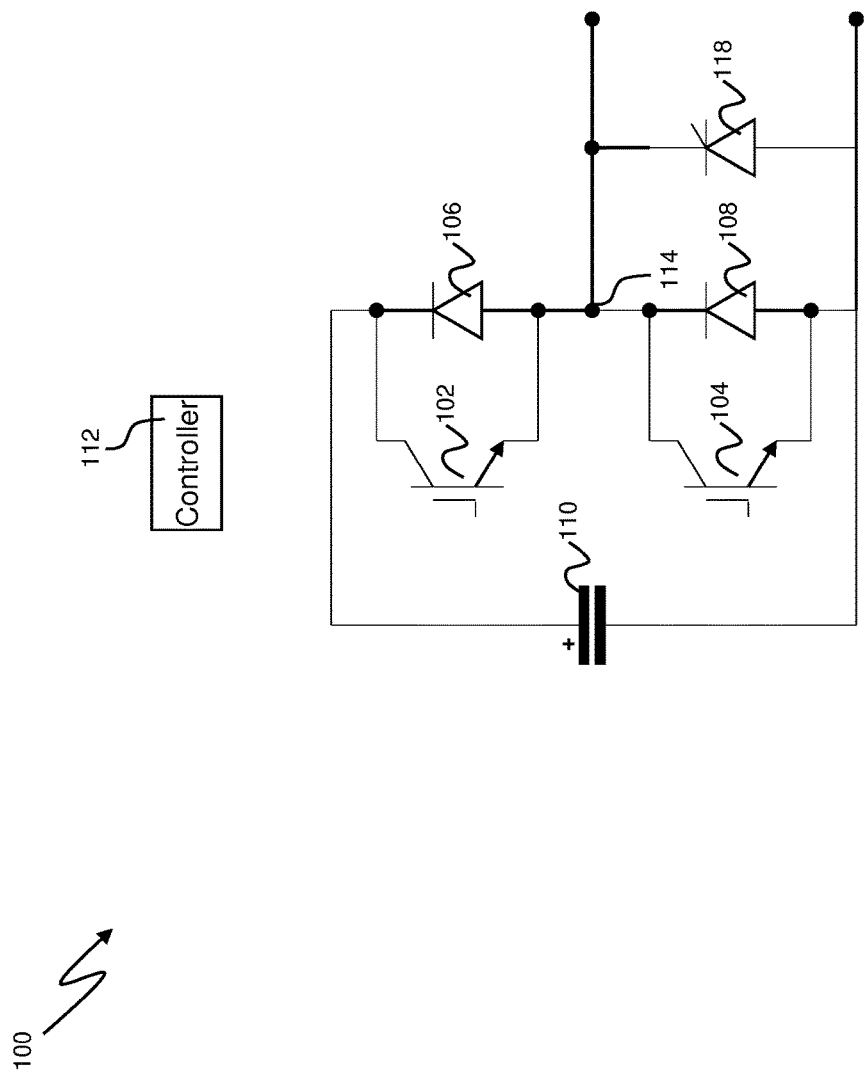
FIG. 1 is a schematic representation of a submodule of a modular multilevel converter which uses insulated-gate bipolar transistors as switching elements.
Figure 2:
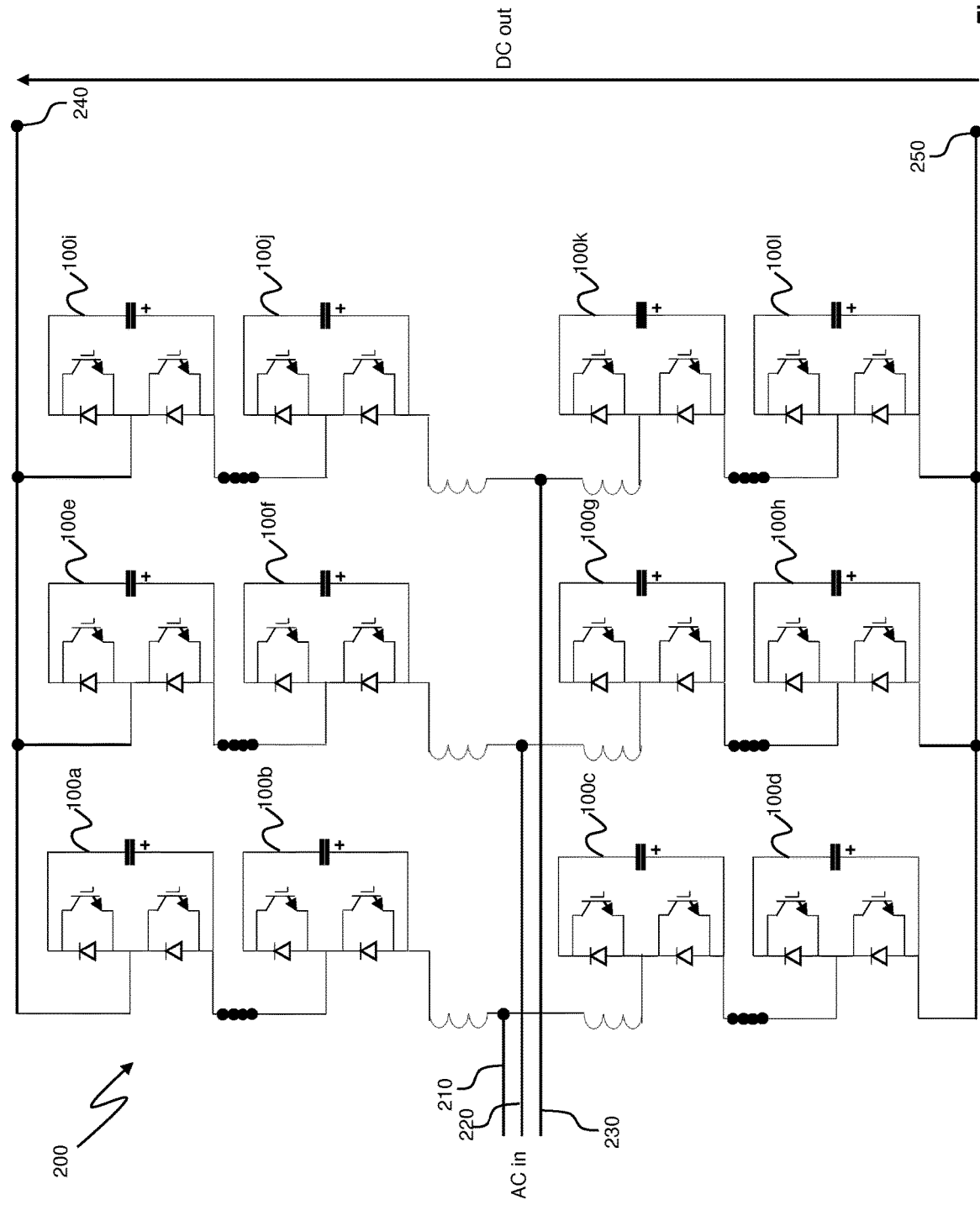
FIG. 2 is a schematic representation of a modular multilevel converter including a plurality of submodules.

In contrast with the submodule 100 of FIG. 1, the submodule 300 of FIG. 4 does not include separate freewheel diodes. This is because when the MOSFETs 302, 304 are turned on an efficient, low-resistance conducting channel is formed in the MOSFET, capable of carrying current through the MOSFET current in either direction (i.e. source to drain or drain to source).

Additionally, each of the MOSFETs 302, 304 includes a respective intrinsic body diode 306, 308, shown in dashed outline in FIG. 4. As shown in FIG. 4, an anode of the first intrinsic body diode 306 associated with the first MOSFET 302 is connected to the source terminal of the first MOSFET 302 and a cathode of the first intrinsic body diode 306 is connected to the drain terminal of the first MOSFET 302. Similarly, an anode of the second intrinsic body diode 308 associated with the second MOSFET 304 is connected to the source terminal of the second MOSFET 304 and the cathode of the second intrinsic body diode 308 is connected to the drain terminal of the second MOSFET 304.

In the on state of the MOSFETs 302, 304, the voltage drop across the intrinsic body diodes 306, 308 is (for silicon carbide MOSFETs) typically 3-4 times as high as the voltage drop across a comparable silicon diode. In order to avoid overheating of the MOSFETs 302, 304, the body diodes 306, 308 therefore need to be prevented from carrying current for prolonged periods of time.

As in the submodule 100 of FIG. 1, the submodule 300 includes a protection device 318, which in the illustrated example is a protection thyristor. The protection thyristor 318 is connected in an inverse parallel arrangement with the second MOSFET 304 of the submodule 300, with its anode connected to the source terminal of the second MOSFET 304 and its cathode connected to the drain terminal of the second MOSFET 304.

A gate terminal of the protection thyristor 318 is connected to an output of the controller 312 in order to receive a control signal to switch the protection thyristor 318 on in the event that an overcurrent event such as a short circuit between DC output terminals of an MMC incorporating a plurality of submodules 300 is detected. With the protection thyristor 318 switched on the fault current arising from the overcurrent event is divided between the protection thyristor 318 and the intrinsic body diode 308 of the second MOSFET 304.

In normal operation of the submodule 300, during commutation between the first MOSFET 302 and the second MOSFET 304, it is necessary briefly to use the intrinsic body diode during a period known as the "non-overlap delay" (also referred to as the "dead time"), in order to prevent simultaneous forward conduction by both MOSFETs 302, 304. Such simultaneous forward conduction would cause uncontrolled discharge of the storage element 310.

Figure 5:
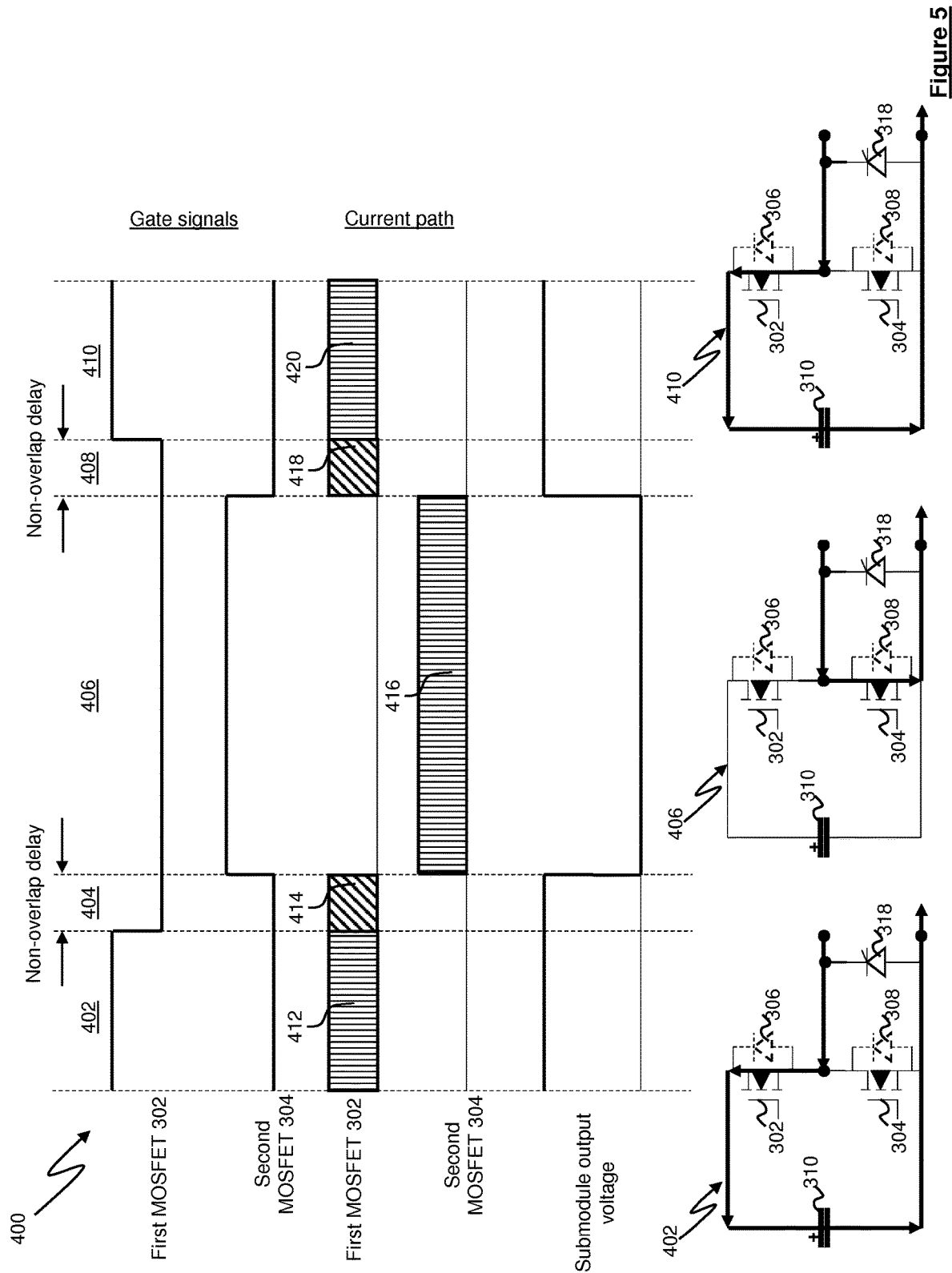
FIG. 5 is a timing diagram schematically illustrating normal operation of the submodule of FIG. 4.

FIG. 5 shows how the intrinsic body diode is used during the non-overlap delay in normal operation of the submodule 300. FIG. 5 shows representative traces for the signals at the gate terminals of the first and second MOSFETs 302, 304 (topmost two traces), a current path through the submodule 300 (middle two traces), and the output voltage of the submodule (lowermost trace), as well as schematic representations of the submodule 300 showing current paths through the submodule 300.

In the example illustrated generally at 400 in FIG. 5, the submodule 300 starts in an output state during a first period 402. In this state, the controller 312 outputs a high output signal to the gate terminal of the first MOSFET 302, thus switching the first MOSFET 302 on. The controller 312 outputs a low output signal to the gate terminal of the second MOSFET 304, thus keeping the second MOSFET 304 switched off. Current flows through the channel of the first MOSFET 302 in the reverse direction, as represented by the box 412 in the "current path" trace of FIG. 5 and indicated in the bottom left representation of the submodule 300 in FIG. 5.

During a first non-overlap delay period 404, the gate terminal of the first MOSFET 302 receives a low input signal from the controller 312, thus switching the first MOSFET 302 off. During this first non-overlap delay period 404 the gate terminal of the second MOSFET 304 continues to receive a low input signal from the controller 312, thus maintaining the second MOSFET 304 in its switched off state. Current is therefore forced to flow through the body diode 306 of the first MOSFET 302, as represented by the box 414 of the "current path" trace of FIG. 5.

During a second period 406, the gate terminal of the second MOSFET 304 receives a high input signal from the controller 312, thus switching the second MOSFET 304 on. During this second period 406 the gate terminal of the first MOSFET 302 continues to receive a low input signal from the controller 312, thus maintaining the first MOSFET 302 in its switched off state. The submodule 300 enters a bypass state in which current flows through the channel of the second MOSFET 304 in the forward direction, as represented by the box 416 in the "current path" trace of FIG. 5 and indicated in the central representation of the submodule 300 in FIG. 5.

Subsequently, during a second non-overlap delay period 408, the controller 312 outputs a low output signal to the gate terminal of the second MOSFET 304, thus switching off the second MOSFET 304. During this second non-overlap delay period 408 the first MOSFET 302 continues to receive a low input signal from the controller 312 at its gate terminal, thus maintaining the first MOSFET 302 in its off state. Current is therefore forced to flow through the body diode 306 of the first MOSFET 302, as represented by the box 418 of the "current path" trace of FIG. 5.

During a third period 410 the gate terminal of the first MOSFET 302 receives a high input signal from the controller 312, thus switching the first MOSFET 302 on. The gate terminal of the second MOSFET 304 continues to receive a low input signal from the controller 312 during this third period 410, thus maintaining the second MOSFET 304 in its switched off state. Current flows through the channel of the first MOSFET 302 in the reverse direction, as represented by the box 420 in the "current path" trace of FIG. 5, and indicated in the bottom right representation of the submodule 300 in FIG. 5.

It will be appreciated that when current flows in the submodule 300 in the opposite direction to that illustrated in FIG. 5, the roles of the first and second MOSFETs 302, 304 and their respective channels and body diodes 306, 308 are reversed in the commutation of current in the submodule 300.

If the submodule 300 were controlled in the same way as the submodule 100 of FIG. 1 in the event of an overcurrent condition such as a DC terminal to terminal short circuit in a MMC incorporating a plurality of submodules 300, the problem discussed above of switching on of the protection thyristor 318 would become even more serious, because in normal operation of the submodule 300 the forward voltage drop across the channel of the second MOSFET 304 is very low. Thus, if the submodules 300 were configured to operate in the same manner as the submodule 100 described above, the protection thyristor 318 would be required to switch on at an even lower anode-cathode voltage than the protection thyristor 118 of the submodule 100 of FIG. 1.

The inventors have realised that the high forward voltage drop across the intrinsic body diode 308 associated with the second MOSFET 304 can be harnessed to facilitate the commutation of current from the second MOSFET 304 to the protection thyristor 318 in the event of an overcurrent event such as a DC terminal to terminal short circuit in an MMC incorporating a plurality of submodules 300. By switching the channel of the second MOSFET 304 off before the thyristor 318 is switched on, current can be forced to flow through the body diode 308 of the second MOSFET 304. As indicated above, the forward voltage drop across the body diode 308 is significantly higher than the forward voltage drop across a comparable separate silicon freewheel diode of the kind used in the submodule 100, so when the body diode 308 is conducting the voltage across the protection thyristor 318 is sufficiently high as to effect a rapid transfer of current from the body diode 308 to the protection thyristor 318.

Figure 6:
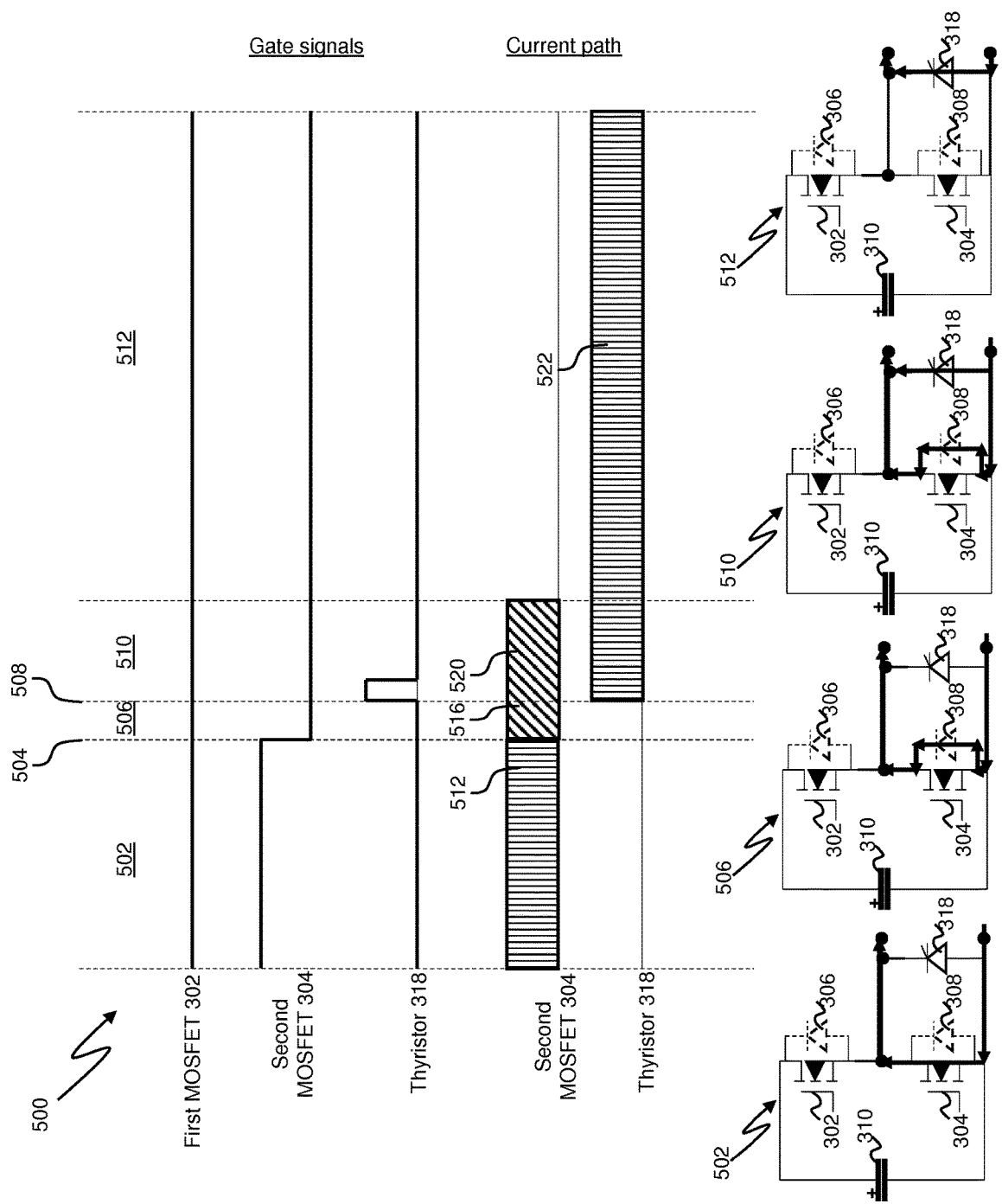
FIG. 6 is a timing diagram schematically illustrating operation of the submodule of FIG. 4 in the event of detection of an overcurrent event.

This concept is illustrated in FIG. 6, which shows representative traces for the signals at the gate terminals of the first and second MOSFETs 302, 304 and at the gate terminal of the protection thyristor 318 (topmost three traces), and a current path through the submodule 300 (lower two traces), as well as schematic representations of the submodule 300 showing current paths through the submodule 300.

The submodule 300 is initially in the bypass state during a first period 502. In this first period 502, the controller 318 outputs a low input signal to the gate terminal of the first MOSFET 302, such that the first MOSFET 302 is switched off, and outputs a high input signal to the gate terminal of the second MOSFET 304, such that the second MOSFET 304 is switched on. The controller 312 also outputs a low input signal to the gate terminal of the protection thyristor 318, such that the protection thyristor 318 is switched off. Thus, during the first period 502, current flows through the channel of the second MOSFET 304, as shown at 516 in the "current path" trace of FIG. 6, and shown graphically in the left-most representation of the sub-module 300 in FIG. 6.

At a point 504, an overcurrent event such as a DC terminal to terminal short circuit event is detected, and the controller 312 outputs a low output signal to the gate terminal of the second MOSFET 304 to cause the second MOSFET 304 to switch off. The controller 318 continues to output a low output signal to the gate terminal of the first MOSFET 302, such that the first MOSFET 302 remains switched off. The controller 318 also continues to output a low output signal to the gate terminal of the protection thyristor 318, such that the protection thyristor 318 remains switched off. Thus, during a second period 506 in which both the first and second MOSFETs 302, 304 and the protection thyristor 318 are switched off, current is forced to flow through the body diode 308 of the first MOSFET 302, as shown at 516 in the "current path" trace of FIG. 6, and as shown graphically in the second representation of the sub-module 300 in FIG. 6.

At a point 508, the controller 318 outputs a high output signal to the gate terminal of the protection thyristor 318, such that the protection thyristor 318 switches on and begins conducting. The controller 312 continues to output low output signals to the gate terminals of the first and second MOSFETs 302, 304, thereby maintaining the first and second MOSFETs 302, 304 in their off state.

Thus, during a third period 510, current is conducted by both the body diode 308 and the protection thyristor 318, as shown at 520 in the "current path" trace of FIG. 6, and as shown graphically in the third representation of the sub-module 300 in FIG. 6.

Because of the large forward voltage drop across the intrinsic body diode 308 of the second MOSFET 304, a large anode-cathode voltage develops across the protection thyristor 318, causing the protection thyristor 318 rapidly to switch fully on. Thus, the duration of the third period 520 is short, and during a subsequent fourth period 512 substantially only the protection thyristor 318 conducts (that is to say the vast majority of current in the submodule 300 resulting from the overcurrent event is conducted by the protection thyristor 318), as shown at 522 in the "current path" trace of FIG. 6, and as shown graphically in the fourth representation of the sub-module 300 in FIG. 6.

In this way, the first and second MOSFETs 302, 304 are protected from potentially damaging currents, as on detection of an overcurrent event the current flowing in the submodule 300 is diverted away from the channels of the first and second MOSFETs 302, 304 and is rapidly commutated from the intrinsic body diode 308 of the second MOSFET 304 to the protection thyristor 318. Once the current has been commutated fully to the protection thyristor 318, it is possible (if necessary or desired) to turn the second MOSFET 304 on again so that the current is shared between the protection thyristor 318 and the second MOSFET 304.

Figure 7:
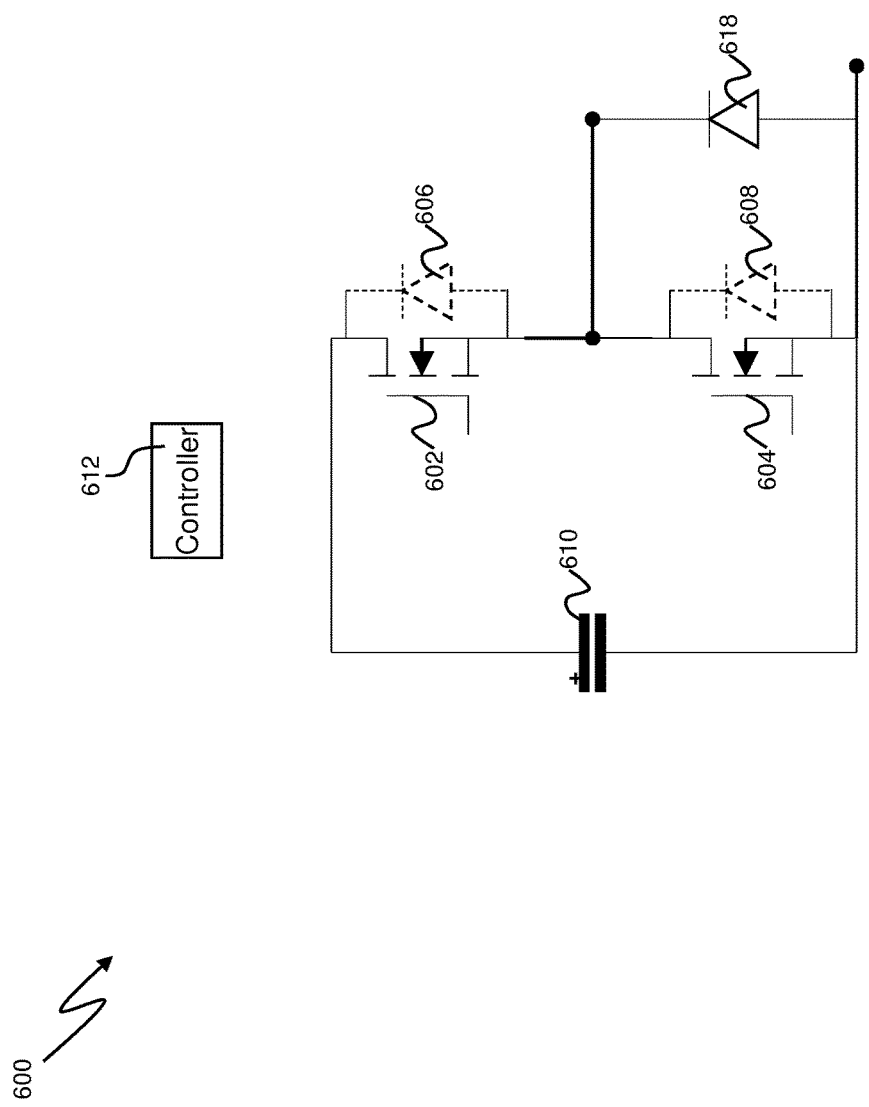
FIG. 7 is a schematic representation of an alternative submodule.

FIG. 7 is a schematic representative of an alternative half-bridge submodule for an MMC. The submodule 600 of FIG. 7 is similar to the submodule 300 of FIG. 4, with the exception that the protection element in the submodule 600 is a silicon diode rather than a thyristor.

Thus, the submodule 600 includes a first switching element 602 connected in series with a second switching element 604. In the submodule 600 of FIG. 7 the first and second switching elements 602, 604 are MOSFET devices, such as silicon carbide MOSFET devices.

A source terminal of the first MOSFET 602 is connected to a drain terminal of the second MOSFET 604. A drain terminal of the MOSFET 602 is connected to a positive terminal of an energy storage element such as a capacitor 610, whilst a source terminal of the second MOSFET 604 is connected to a negative terminal of the energy storage element 610.

Gate terminals of the first and second MOSFETs 602, 604 are connected to outputs of a controller 612, which is configured to generate control signals to switch the first and second MOSFETs 602, 604 on and off in a predetermined sequence.

Like the submodule 300 of FIG. 4, the submodule 600 of FIG. 7 does not include separate freewheel diodes. This is because when the MOSFETs 602, 604 are turned on an efficient, low-resistance conducting channel is formed in the MOSFET, capable of carrying current through the MOSFET current in either direction (i.e. source to drain or drain to source).

Additionally, each of the MOSFETs 602, 604 includes a respective intrinsic body diode 606, 608, shown in dashed outline in FIG. 7. As shown in FIG. 7, an anode of the first intrinsic body diode 606 associated with the first MOSFET 602 is connected to the source terminal of the first MOSFET 602 and a cathode of the first intrinsic body diode 606 is connected to the drain terminal of the first MOSFET 602. Similarly, an anode of the second intrinsic body diode 608 associated with the second MOSFET 604 is connected to the source terminal of the second MOSFET 604 and the cathode of the second intrinsic body diode 608 is connected to the drain terminal of the second MOSFET 604.

As indicated above, the submodule 600 include a protection device 618, in the form of a diode. The protection diode 618 is connected in an inverse parallel arrangement with the second MOSFET 604 of the submodule 600, with its anode connected to the source terminal of the second MOSFET 604 and its cathode connected to the drain terminal of the second MOSFET 604.

In normal operation the submodule 600 operates as described above with reference to FIG. 5, with the controller 618 outputting appropriate control signals to the gate terminals of the first and second MOSFETs 602, 604 to switch the first and second MOSFETs 602, 604 on and off in the correct sequence.

In the event of an overcurrent event such as a DC terminal to terminal short circuit in an MMC incorporating a plurality of submodules 600, the submodule 600 operates in a similar manner to the submodule 300 described above with reference to FIG. 6. However, as the protection diode 618 has no gate terminal, the controller 612 need not output a control signal to the protection diode 618. Instead, the protection diode 618 begins to conduct as soon as the anode-cathode voltage across it reaches the threshold voltage of the protection diode 618, which occurs very quickly due to the large forward voltage drop across the body diode 608 of the second MOSFET 604. Once the current has been commutated fully to the protection diode 318, it is possible (if necessary or desired) to turn the second MOSFET 604 on again so that the current is shared between the protection diode 618 and the second MOSFET 604.

Figure 3:
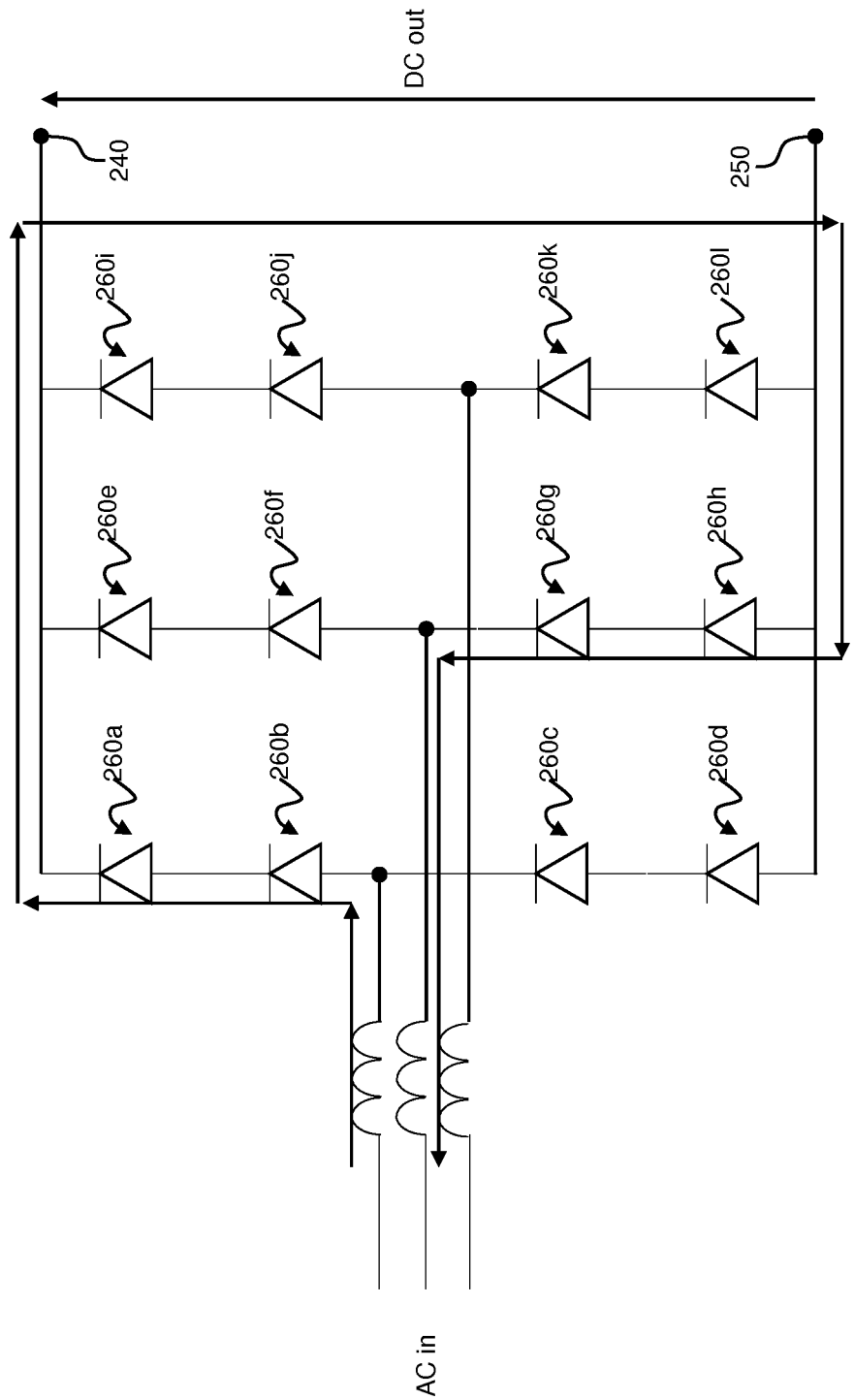
FIG. 3 illustrates current flow in a converter of the kind shown in FIG. 2 in the event of a DC terminal to terminal short circuit.

The exemplary submodules 300, 600 of FIGS. 3 and 6 each employ a series combination of two MOSFETs with a protection device connected in parallel with the second of these MOSFETs.

The speed with which current is commutated to the protection device can be improved by connecting the protection device in parallel with a series combination of two or more MOSFETs. In such arrangements, the total forward voltage drop across the body diodes of the series connected MOSFETs is equal to the sum of the forward voltage drops across each body diode. Thus, assuming that the forward voltage drop VF across each of the body diodes is equal, the total forward voltage drop across all of the body diodes of a number N of MOSFETs connected in series will by $NV_F$. A result of this increase in the forward voltage drop across the body diodes of the series connected MOSFETs is that a large voltage develops across the protection device more quickly than in the submodules 300, 600 of FIGS. 4 and 7, causing the protection device to switch fully on even more rapidly.

FIGS. 8-11 are schematic representations of submodules in which a protection device is connected in parallel with a series combination of two MOSFETs, though it is to be appreciated that variants of each of the submodules shown in FIGS. 8-11 in which the protection device is connected in parallel with a series combination of any number of MOSFETs are possible.

Figure 8:
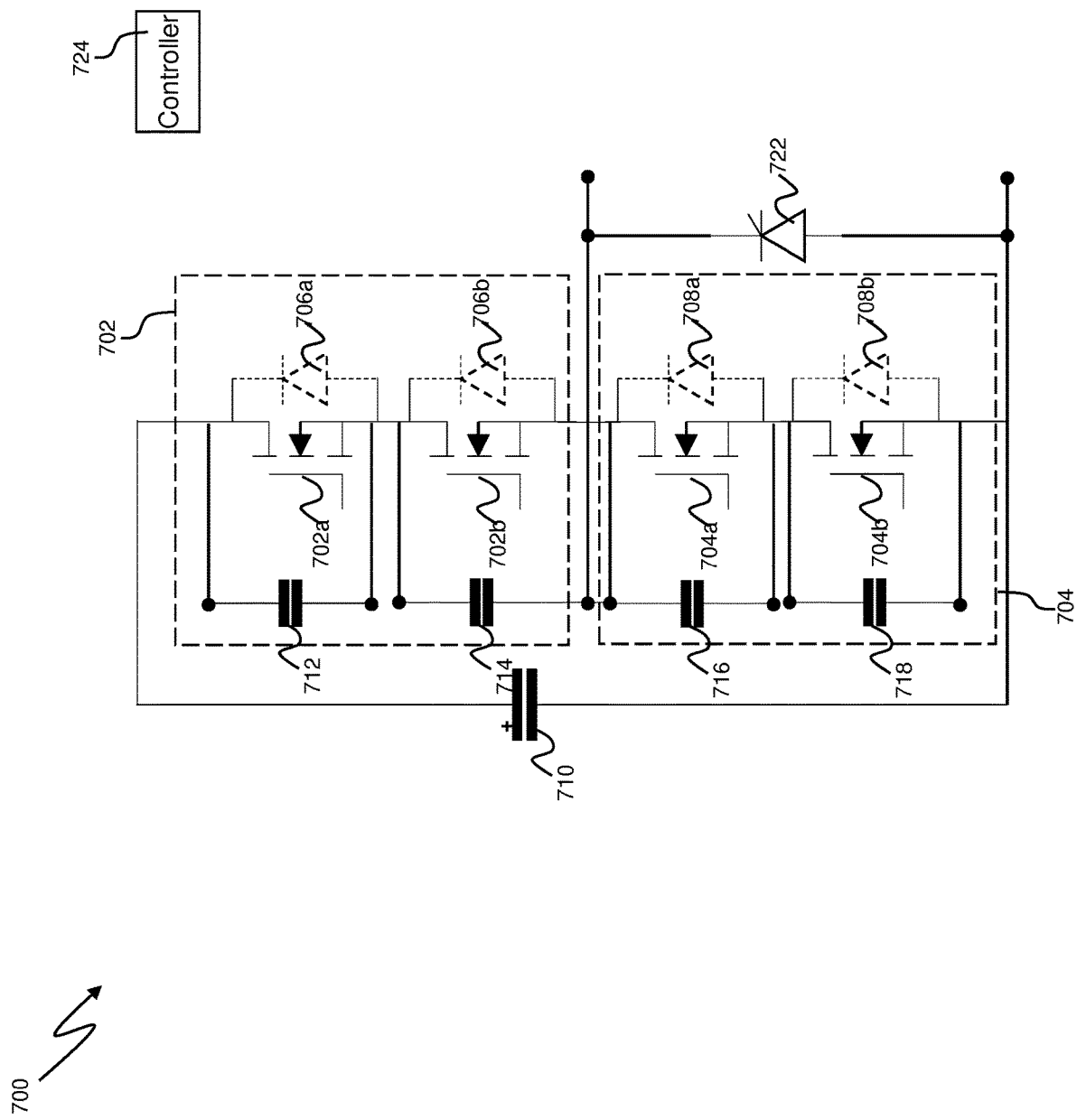
FIG. 8 is a schematic representation of a further alternative submodule.

FIG. 8 is a schematic representation of an alternative submodule. This submodule, shown generally at 700 in FIG. 8, is a two-level submodule in which two MOSFETs are connected in series at each switch position.

Thus, the submodule 700 of FIG. 8 includes a first switching element 702 connected in series with a second switching element 704. The first switching element 702 comprises first and second series connected MOSFETs 702a, 702b. A source terminal of the first MOSFET 702a is connected to a drain terminal of the second MOSFET 702b. A drain terminal of the first MOSFET 702a is connected to a positive terminal of an energy storage element such as a capacitor 710, whilst a source terminal of the second MOSFET 702b is connected to the second switching element 704 in the manner described below.

The second switching element 704 comprises first and second series connected MOSFETs 704a, 704b. A source terminal of the first MOSFET 704a is connected to a drain terminal of the second MOSFET 704b. A drain terminal of the first MOSFET 704a is connected to the source terminal of the second MOSFET 702b of the first switching element 702, whilst a source terminal of the second MOSFET 704b is connected to a negative terminal of the energy storage element 710.

A further energy storage element (e.g. a capacitor) may be connected in parallel with each of the MOSFETs to assist with voltage sharing between the series connected MOSFETs. Thus, a first further storage element 712 is connected in parallel with the first MOSFET 702a of the first switching element 702, a second further storage element 714 is connected in parallel with the second MOSFET 702b of the first switching element 702, third further storage element 716 is connected in parallel with the first MOSFET 704a of the second switching element 704 and a fourth further storage element 718 is connected in parallel with the second MOSFET 704b of the second switching element 704. Gate terminals of the MOSFETs 702a, 702b, 704a, 704b are connected to outputs of a controller 724, which is configured to generate control signals to switch the MOSFETs 702a, 702b, 704a, 704b on and off in a predetermined sequence.

Each of the MOSFETs 702a, 702b of the first switching element 702 includes a respective intrinsic body diode 706a, 706b, shown in dashed outline in FIG. 8. Similarly each of the MOSFETs 702a, 702b includes a respective intrinsic body diode 706a, 706b, also shown in dashed outline in FIG. 8. As shown in FIG. 8, an anode of the intrinsic body diode 706a associated with the MOSFET 702a is connected to the source terminal of the MOSFET 702a and a cathode of the intrinsic body diode 706a is connected to the drain terminal of the MOSFET 702a. Similarly, an anode of the intrinsic body diode 706b associated with the MOSFET 702b is connected to the source terminal of the MOSFET 702b and the cathode of the intrinsic body diode 706b is connected to the drain terminal of the MOSFET 702b. An anode of the intrinsic body diode 708a associated with the MOSFET 704a is connected to the source terminal of the MOSFET 704a and a cathode of the intrinsic body diode 708a is connected to the drain terminal of the MOSFET 704a. Similarly, an anode of the intrinsic body diode 708b associated with the MOSFET 704b is connected to the source terminal of the MOSFET 708b and the cathode of the intrinsic body diode 708b is connected to the drain terminal of the MOSFET 704b The submodule 700 includes a protection device 722, which in the illustrated example is a protection thyristor, but which could equally be a diode. The protection device 722 is connected in an inverse parallel arrangement with the second switching element 704 of the submodule 700 (i.e. the protection device 722 is connected in an inverse parallel arrangement with the series combination of the MOSFETs 704a, 704b) with its anode connected to the source terminal of the MOSFET 704b and its cathode connected to the drain terminal of the MOSFET 704a.

Where the protection device 722 is a thyristor, its gate terminal is connected to an output of the controller 712 in order to receive a control signal to switch the protection device 722 on in the event that an overcurrent event is detected, e.g. a short circuit between DC output terminals of an MMC incorporating a plurality of submodules 700. With the protection device 722 switched on the fault current arising from the overcurrent event is divided between the protection device 722 and the intrinsic body diodes 708a, 708b of the second switching element 704.

The submodule 700 operates in a similar manner to the submodule 300 described above, with the exception that the controller 724 is configured to generate control signals to switch both of the MOSFETs 702a, 702b of the first switching element 702 or both of the MOSFETs 704a, 704b of the second switching element 704 on or off. When an overcurrent event is detected, the controller 724 outputs control signals to the gate terminals of the MOSFETs 702a, 702b of the first switching element 702 to switch those MOSFETs off, and outputs control signals to the gate terminals of the MOSFETs 704a, 704b of the second switching element 704 to switch those MOSFETs off. If the protection device 722 is a thyristor, then after the MOSFETs 704a, 704b of the second switching element 704 have been switched off, the controller 724 outputs a control signal to switch the protection device 722 on. If the protection device 722 is a diode, no such control signal is required. As described above in relation to the submodule 300, this sequence forces current initially to flow through the body diodes of the MOSFETs 704a, 704b of the second switching element, before commutating rapidly to the protection device 722, thereby protecting the MOSFETs 702a, 702b, 704a, 704b from the high current caused by the overcurrent event.

Figure 9:
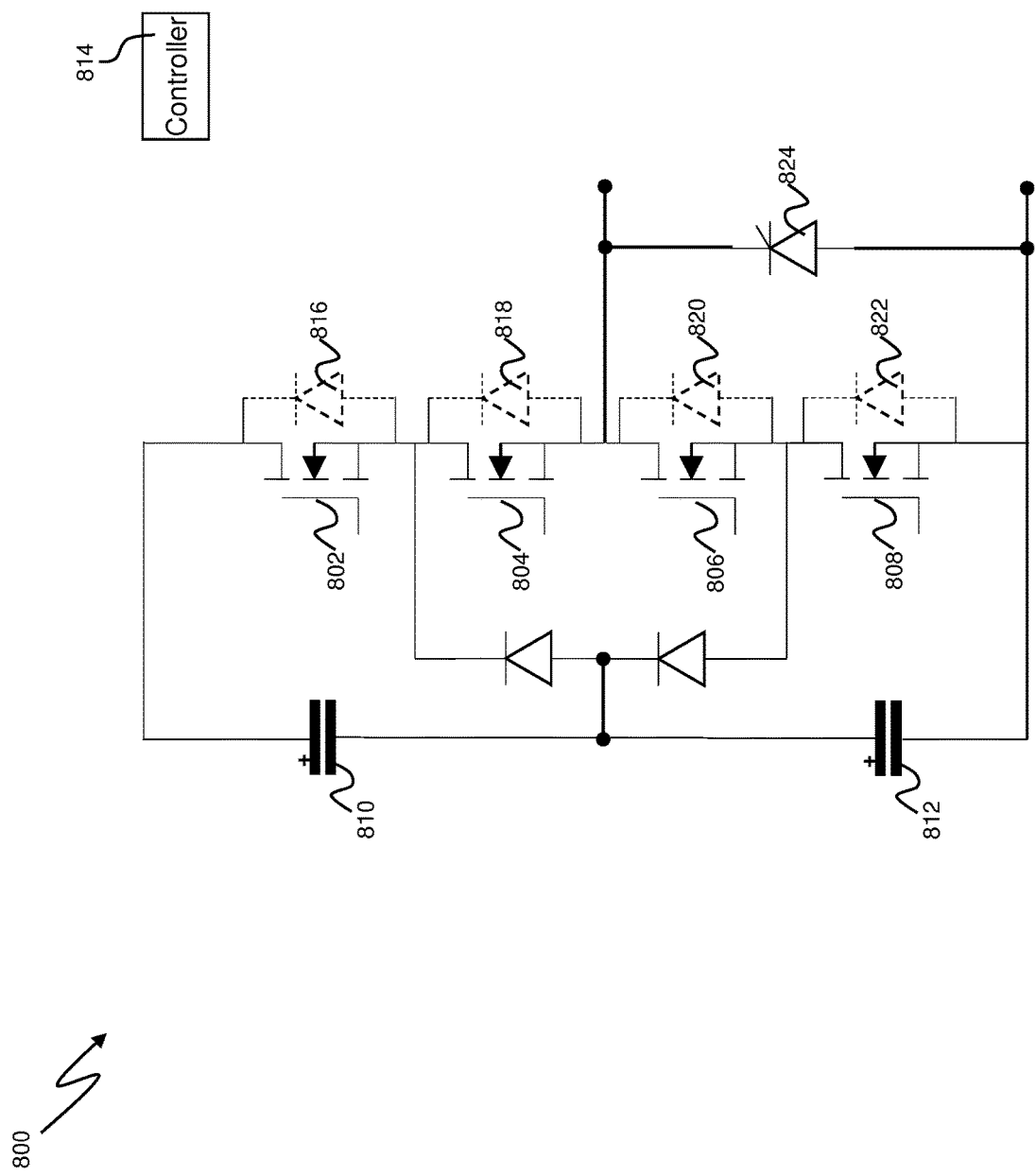
FIG. 9 is a schematic representation of a further alternative submodule.

FIG. 9 is a schematic representation of a further alternative submodule. This submodule, shown generally at 800 in FIG. 9, is a neutral-point-clamped (NPC) submodule with four independent switching elements.

The submodule 800 of FIG. 9 includes a first, second, third and fourth series-connected switching elements in the form of MOSFETs 802, 804, 806, 808. A source terminal of the first MOSFET 802 is connected to a drain terminal of the second MOSFET 804. A drain terminal of the first MOSFET 802 is connected to a positive terminal of a first energy storage element such as a capacitor 810. A source terminal of the second MOSFET 804 is connected to a drain terminal of the third MOSFET 806, and a source terminal of the third MOSFET 806 is connected to a drain terminal of the fourth MOSFET 808. A source terminal of the fourth MOSFET 808 is connected to a negative terminal of a second storage element such as a capacitor 812. A positive terminal of the second energy storage element 812 is connected to a negative terminal of the first energy storage element 810.

Gate terminals of the MOSFETs 802, 804, 806, 808 are connected to outputs of a controller 814, which is configured to generate control signals to switch the MOSFETs 802, 804, 806, 808 on and off in a predetermined sequence.

Each of the MOSFETs 802, 804, 806, 808 includes a respective intrinsic body diode 816, 818, 820, 822, shown in dashed outline in FIG. 9. As shown in FIG. 9, an anode of the intrinsic body diode 816 associated with the MOSFET 802 is connected to the source terminal of the MOSFET 802 and a cathode of the intrinsic body diode 816 is connected to the drain terminal of the MOSFET 802. Similarly, an anode of the intrinsic body diode 818 associated with the MOSFET 804 is connected to the source terminal of the MOSFET 804 and the cathode of the intrinsic body diode 818 is connected to the drain terminal of the MOSFET 804. An anode of the intrinsic body diode 820 associated with the MOSFET 806 is connected to the source terminal of the MOSFET 806 and a cathode of the intrinsic body diode 820 is connected to the drain terminal of the MOSFET 806. Similarly, an anode of the intrinsic body diode 822 associated with the MOSFET 808 is connected to the source terminal of the MOSFET 808 and the cathode of the intrinsic body diode 822 is connected to the drain terminal of the MOSFET 808.

The submodule 800 includes a protection device 824, which in the illustrated example is a protection thyristor, but which could equally be a diode. The protection device 824 is connected in an inverse parallel arrangement with the series combination of the third and fourth MOSFETS 806, 808 of the submodule 800 with its anode connected to the source terminal of the fourth MOSFET 808 and its cathode connected to the drain terminal of the third MOSFET 806.

Where the protection device 824 is a thyristor, its gate terminal is connected to an output of the controller 814 in order to receive a control signal to switch the protection device 824 on in the event that an overcurrent event is detected, e.g. a short circuit between DC output terminals of an MMC incorporating a plurality of submodules 800. With the protection device 824 switched on the fault current arising from the overcurrent event is divided between the protection device 824 and the intrinsic body diodes 820, 822 of the third and fourth MOSFETs 806, 808.

The submodule 800 operates in a similar manner to the submodule 300 described above, with the exception that the controller 814 is configured to generate control signals to switch both the first and second MOSFETs 802, 804 on in order to output a voltage equal to the combined voltage of the first and second capacitors 810, 812, or to switch both the third and fourth MOSFETs 806, 808 on in order to bypass the submodule 800, or to switch the second and third MOSFETs 804, 806 on in order to output an intermediate voltage equal to the voltage of the second capacitor 812.

When an overcurrent event is detected, the controller 814 outputs control signals to the gate terminals of the first, second, third and fourth MOSFETs 802, 804, 806, 808 to switch those MOSFETs off. If the protection device 824 is a thyristor, then after the third and fourth MOSFETs 806, 808 have been switched off, the controller 814 outputs a control signal to switch the protection device 824 on. If the protection device 824 is a diode no such control signal is necessary. As described above in relation to the submodule 300, this sequence forces current initially to flow through the body diodes of the third and fourth MOSFETs 806, 808, before commutating rapidly to the protection device 824, thereby protecting the MOSFETs 802, 804, 806, 808 from the high current caused by the overcurrent event.

Figure 10:
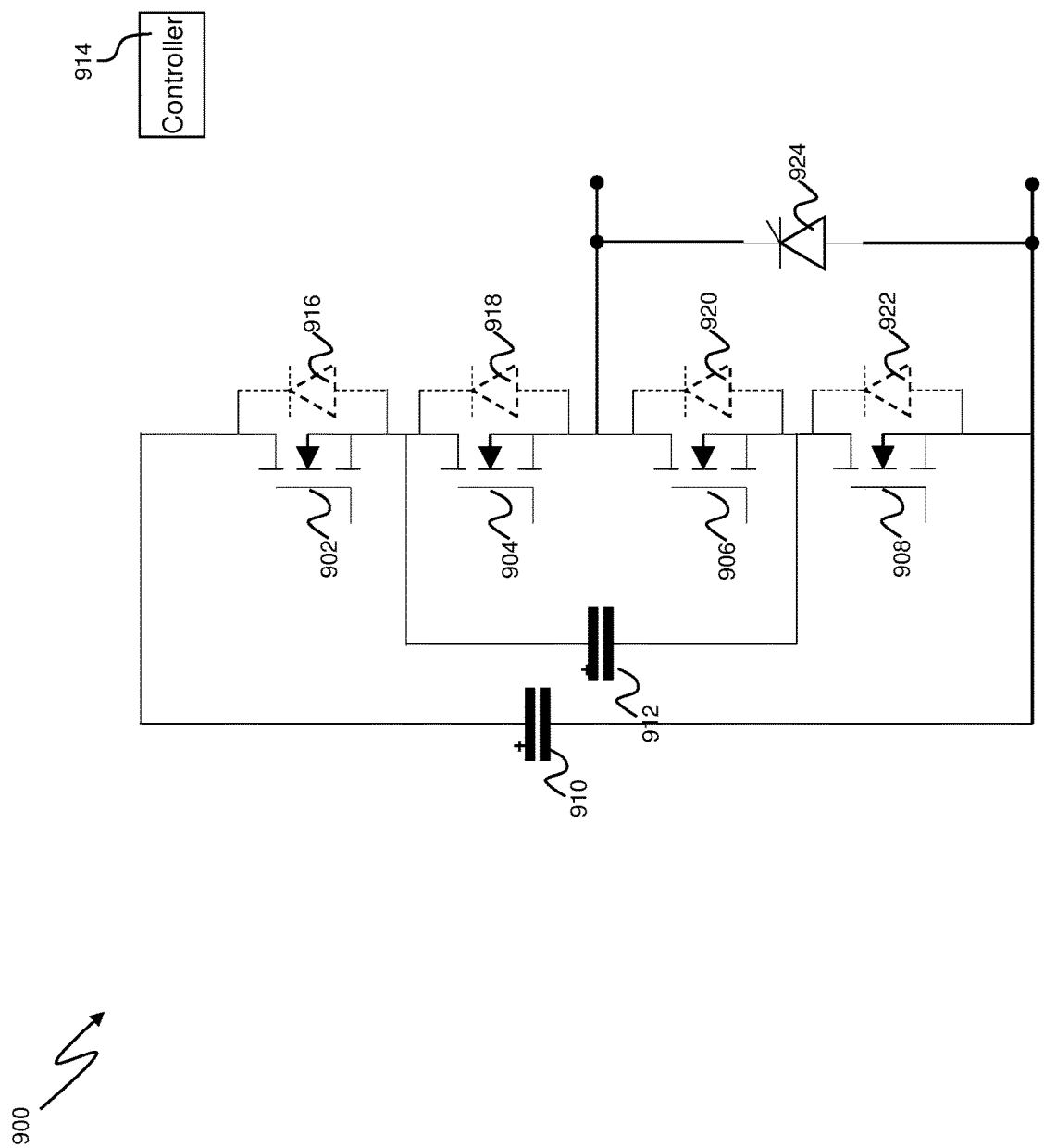
FIG. 10 is a schematic representation of a further alternative submodule.

FIG. 10 is a schematic representation of a further alternative submodule. This submodule, shown generally at 900 in FIG. 10, is a three level flying capacitor submodule having four series-connected switching elements.

The submodule 900 of FIG. 10 includes first, second, third and fourth series-connected switching elements in the form of MOSFETs 902, 904, 906, 908. A source terminal of the first MOSFET 902 is connected to a drain terminal of the second MOSFET 904. A drain terminal of the first MOSFET 902 is connected to a positive terminal of a first energy storage element such as a capacitor 910, whilst a source terminal of the second MOSFET 904 is connected to a drain terminal of the third MOSFET 906. A source terminal of the third MOSFET 906 is connected to a drain terminal of the fourth MOSFET 908, and a source terminal of the fourth MOSFET 908 is connected to a negative terminal of the first energy storage element 910.

The submodule 900 includes a flying capacitor 912. A positive terminal of the flying capacitor 912 is connected to a node between the source terminal of the first MOSFET 902 and the drain terminal of the second MOSFET 904. A negative terminal of the flying capacitor 912 is connected to a node between the source terminal of the third MOSFET 906 and the drain terminal of the fourth MOSFET 908.

Gate terminals of the MOSFETs 902, 904, 906, 908 are connected to outputs of a controller 914, which is configured to generate control signals to switch the MOSFETs 902, 904, 906, 908 on and off in a predetermined sequence.

Each of the MOSFETs 902, 904, 906, 908 includes a respective intrinsic body diode 916, 918, 920, 922, shown in dashed outline in FIG. 10. As shown in FIG. 10, an anode of the intrinsic body diode 916 associated with the MOSFET 902 is connected to the source terminal of the MOSFET 902 and a cathode of the intrinsic body diode 916 is connected to the drain terminal of the MOSFET 902. Similarly, an anode of the intrinsic body diode 918 associated with the MOSFET 904 is connected to the source terminal of the MOSFET 904 and the cathode of the intrinsic body diode 918 is connected to the drain terminal of the MOSFET 904. Likewise, an anode of the intrinsic body diode 920 associated with the MOSFET 906 is connected to the source terminal of the MOSFET 906 and a cathode of the intrinsic body diode 920 is connected to the drain terminal of the MOSFET 906. Similarly, an anode of the intrinsic body diode 922 associated with the MOSFET 908 is connected to the source terminal of the MOSFET 908 and the cathode of the intrinsic body diode 922 is connected to the drain terminal of the MOSFET 908.

The submodule 900 includes a protection device 924, which in the illustrated example is a protection thyristor, but which could equally be a diode. The protection device 924 is connected in an inverse parallel arrangement with the series combination of the third and fourth MOSFETs 906, 908 of the submodule 900, with its anode connected to the source terminal of the MOSFET 908 and its cathode connected to the drain terminal of the MOSFET 906.

Where the protection device 924 is a thyristor, its gate terminal is connected to an output of the controller 914 in order to receive a control signal to switch the protection device 924 on in the event that an overcurrent event is detected, e.g. a short circuit between DC output terminals of an MMC incorporating a plurality of submodules 900. With the protection device 924 switched on the fault current arising from the overcurrent event is divided between the protection device 924 and the intrinsic body diodes 920, 922 of the third and fourth MOSFETs 906, 908.

The submodule 900 operates in a similar manner to the submodule 300 described above, with the exception that the controller 914 is configured to generate control signals to switch both the first and second MOSFETs 902, 904 on to output a voltage equal to the voltage of the first capacitor 910, or to switch both the third and fourth MOSFETs 906, 980 on to bypass the submodule 900, or to switch both the first and third MOSFETs 902, 906 on to output an intermediate voltage equal to the voltage of the first capacitor 910 minus the voltage of the second capacitor 912, or to switch both the second and fourth MOSFETs 904, 908 on to output a voltage equal to the voltage of the second capacitor 912.

When an overcurrent event is detected, the controller 914 outputs control signals to the gate terminals of the MOSFETs 902, 904, 906, 908 to switch those MOSFETs off. If the protection device 924 is a thyristor, then after the MOSFETs 906, 908 have been switched off, the controller 914 outputs a control signal to switch the protection device 924 on. If the protection device 924 is a diode no such control signal is necessary. As described above in relation to the submodule 300, this sequence forces current initially to flow through the body diodes of the MOSFETs 906, 908 of the second switching element, before commutating rapidly to the protection device 924, thereby protecting the MOSFETs 902, 904, 906, 908 from the high current caused by the overcurrent event.

Figure 11:
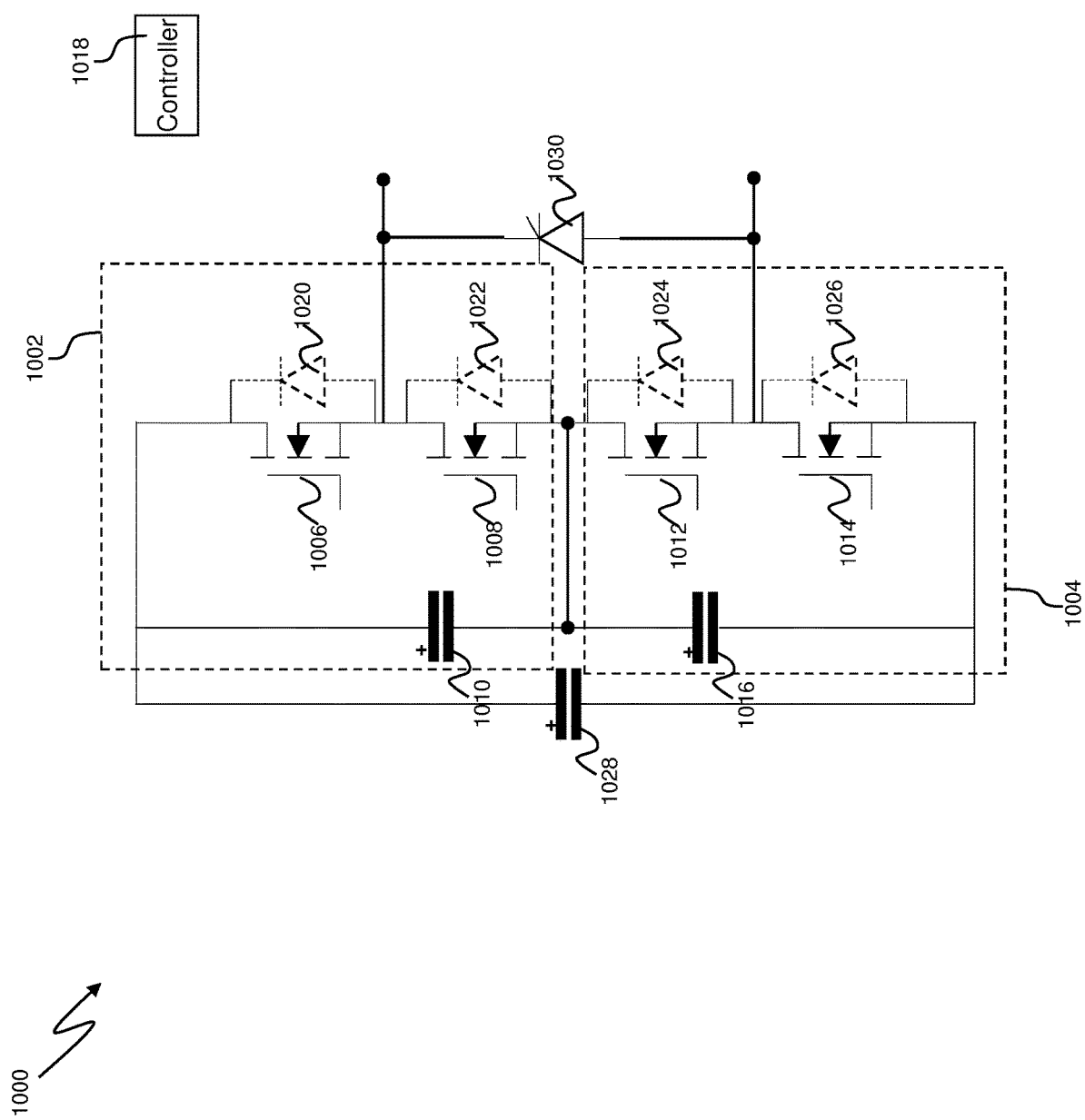
FIG. 11 is a schematic representation of a further alternative submodule.

FIG. 11 is a schematic representation of a further alternative submodule. This submodule, shown generally at 1000 in FIG. 11, comprises a mirror image pair of half bridge submodules.

The submodule 1000 of FIG. 11 comprises a first half bridge arrangement 1002 and a second half bridge arrangement 1004 connected in a mirror image configuration. The first half bridge arrangement 1002 includes a first MOSFET 1006 connected in series with a second MOSFET 1008. A source terminal of the first MOSFET 1006 is connected to a drain terminal of the second MOSFET 1008. A drain terminal of the first MOSFET 1006 is connected to a positive terminal of a first energy storage element such as a capacitor 1010, whilst a source terminal of the second MOSFET 1008 is connected to a negative terminal of the first energy storage element 1010, and to the second half bridge arrangement in the manner described below.

The second half bridge arrangement 1004 includes a first MOSFET 1012 connected in series with a second MOSFET 1014. A source terminal of the first MOSFET 1012 is connected to a drain terminal of the second MOSFET 1014. A drain terminal of the first MOSFET 1012 is connected to a positive terminal of a second energy storage element such as a capacitor 1016, whilst a source terminal of the second MOSFET 1014 is connected to a negative terminal of the second energy storage element 1016.

A node connecting the source terminal of the second MOSFET 1008 of the first half bridge arrangement 1002 to the drain terminal of the first MOSFET 1012 of the second half bridge arrangement 1004 is connected to a node that connects the negative terminal of the first storage element 1010 to the positive terminal of the second storage element 1016.

Gate terminals of the MOSFETs 1006, 1008, 1012, 1014 are connected to outputs of a controller 1018, which is configured to generate control signals to switch the MOSFETs 1006, 1008, 1012, 1014 on and off in a predetermined sequence.

Each of the MOSFETs 1006, 1008, 1012, 1014 includes a respective intrinsic body diode 1020, 1022, 1024, 1026, shown in dashed outline in FIG. 11. As shown in FIG. 11, an anode of the intrinsic body diode 1020 associated with the MOSFET 1006 is connected to the source terminal of the MOSFET 1006 and a cathode of the intrinsic body diode 1020 is connected to the drain terminal of the MOSFET 1006. Similarly, an anode of the intrinsic body diode 1022 associated with the MOSFET 1008 is connected to the source terminal of the MOSFET 1008 and the cathode of the intrinsic body diode 1022 is connected to the drain terminal of the MOSFET 1008. Likewise, an anode of the intrinsic body diode 1024 associated with the MOSFET 1012 is connected to the source terminal of the MOSFET 1012 and a cathode of the intrinsic body diode 1024 is connected to the drain terminal of the MOSFET 1012. Similarly, an anode of the intrinsic body diode 1026 associated with the MOSFET 1014 is connected to the source terminal of the MOSFET 1014 and the cathode of the intrinsic body diode 1026 is connected to the drain terminal of the MOSFET 1014.

The submodule 1000 includes a third storage element such as a capacitor 1028 connected in parallel with the first and second half bridge arrangements 1002, 1004, with a positive terminal of the third storage element 1028 being connected to the drain terminal of the MOSFET 1006 and a negative terminal of the third storage element 1028 being connected to the source terminal of the MOSFET 1014. In a variant of the submodule 1000 the third storage element 1028 may be omitted, permitting fully independent control of the first and second half bridge arrangements 1002, 1004.

The submodule 1000 includes a protection device 1030, which in the illustrated example is a protection thyristor, but which could equally be a diode. The protection device 1030 is connected in an inverse parallel arrangement with the series-connected second MOSFET 1008 of the first half bridge arrangement 1002 and the first MOSFET 1012 of the second half bridge arrangement 1004. Thus, an anode of the protection device 1030 is connected to a node connecting the source terminal of the first MOSFET 1012 of the second half bridge arrangement 1004 to the drain terminal of the second MOSFET 1014 of the second half bridge arrangement 1004, whilst a cathode of the protection device 1030 is connected to a node connecting the source terminal of the first MOSFET 1006 of the first half bridge arrangement 1002 to the drain terminal of the second MOSFET 1008 of the first half bridge arrangement 1002.

Where the protection device 1030 is a thyristor, its gate terminal is connected to an output of the controller 1018 in order to receive a control signal to switch the protection device 1030 on in the event that an overcurrent event is detected, e.g. a short circuit between DC output terminals of an MMC incorporating a plurality of submodules 1000. With the protection device 1030 switched on the fault current arising from the overcurrent event is divided between the protection device 1030 and the intrinsic body diodes 1022, 1024 of the MOSFETs 1008, 1012.

The submodule 1000 operates in a similar manner to the submodule 300 described above, with the exception that the controller 1018 is configured to generate control signals to switch both of the MOSFETs 1006, 1008 of the first half bridge arrangement 1002 and both of the MOSFETs 1012, 1014 of the second half bridge arrangement 1004 on or off. When an overcurrent event is detected, the controller 1018 outputs control signals to the gate terminals of the MOSFETs 1006, 1008 of the first half bridge arrangement 1002 to switch those MOSFETs off, and outputs control signals to the gate terminals of the MOSFETs 1012, 1014 of the second half bridge arrangement 1004 to switch those MOSFETs off. If the protection device 1030 is a thyristor, then after the MOSFET 1008 has been switched off, the controller 1018 outputs a control signal to switch the protection device 1030 on. If the protection device 1030 is a diode no such control signal is necessary. As described above in relation to the submodule 300, this sequence forces current initially to flow through the body diodes of the MOSFETs 1008, 1012, before commutating rapidly to the protection device 1030, thereby protecting the MOSFETs 1008, 1012 from the high current caused by the overcurrent event.

As discussed above, the protection device in the submodules of FIGS. 4 and 7-11 may be thyristors, or may instead be diodes such as silicon diodes. Whether a diode or a thyristor is used as the protection device, the protection device may be provided in a press-pack housing, which provides high surge current capability. In the submodules discussed above and illustrated in FIGS. 4 and 7-11, the on-state voltage of the protection diode can be significantly higher than that of the channels of the MOSFET in normal operation, meaning that in normal operation of the submodules almost no current flows in the protection diode. However, the on-state voltage of the protection diode is significantly lower than the on-state voltage of the body diodes of the MOSFETs, meaning that in an overcurrent event current will commutate to the protection diode rather than flowing through the body diodes of the MOSFETs. Thus, the cost and complexity of the submodules can be reduced by using a diode such as a silicon diode instead of a thyristor as the protection device.

As will be appreciated from the foregoing description, the submodules of FIGS. 43 and 7-11 benefit from a protection mechanism that rapidly commutates current arising in an overcurrent event from the vulnerable MOSFET switching devices of the submodules to a protection device. The protection mechanism exploits the high forward voltage drop of the intrinsic body diodes of the MOSFET switching devices in order to develop a large voltage across the protection device, which facilitates the rapid switching of the protection device into a conducting or on state.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality. Any reference signs in the claims shall not be construed so as to limit their scope.

The invention claimed is:

1. A voltage source converter (VSC), the VSC comprising:
   a first MOSFET switching element including a first body diode;
   a second MOSFET switching element including a second body diode, the second MOSFET switching element being connected in series with the first MOSFET switching element, the first and second MOSFET switching elements comprising silicon carbide MOSFETs;
   a protection device, comprising a thyristor, connected in parallel with the second MOSFET switching element; and
   a controller, wherein the controller is configured, on detection of an overcurrent event, to:
   switch off the first MOSFET switching element;
   switch off the second MOSFET switching element, thereby forcing current flowing in the VSC following the overcurrent event to flow through the second body diode rather than through conducting channels of the first and second MOSFET switching elements; and
   switch on the thyristor after switching off the second MOSFET switching element, such that the current initially flows through the second body diode before being commutated to flow substantially only through the thyristor.

2. The VSC according to claim 1 wherein the second MOSFET switching element comprises a plurality of series-connected MOSFETs.

3. The VSC according to claim 1 wherein the VSC is a VSC submodule for a modular multilevel converter.

4. A modular multilevel converter comprising a VSC submodule, the VSC submodule comprising a VSC according to claim 1.

5. The VSC according to claim 1, wherein:
   the first MOSFET switching element comprises:
      a first silicon carbide MOSFET;
      a second silicon carbide MOSFET;
      the first body diode, connected to the first silicon carbide MOSFET;
      a third body diode, connected to the second silicon carbide MOSFET;
      a first storage element connected in parallel with the first silicon carbide MOSFET; and
      a second storage element connected in parallel with the second silicon carbide MOSFET; and
   the second MOSFET switching element comprises:
      a third silicon carbide MOSFET;
      a fourth silicon carbide MOSFET;
      the second body diode, connected to the third silicon carbide MOSFET;
      a fourth body diode, connected to the fourth silicon carbide MOSFET;
      a third storage element connected in parallel with the third silicon carbide MOSFET; and
      a fourth storage element connected in parallel with the fourth silicon carbide MOSFET.

6. A method for controlling operation of a voltage source controller (VSC), wherein the VSC comprises:
   a first MOSFET switching element including a first body diode;
   a second MOSFET switching element including a second body diode, the second MOSFET switching element being connected in series with the first MOSFET switching element, the first and second MOSFET switching elements comprising silicon carbide MOSFETs;
a protection device, comprising a thyristor and a diode, connected in parallel with the second MOSFET switching element; and
a controller,
wherein the method comprises:
detecting an overcurrent event and, in response to detection of the overcurrent event:
switching off the first MOSFET switching element;
switching off the second MOSFET switching element, thereby forcing current flowing in the VSC following the overcurrent event to flow through the second body diode rather than through conducting channels of the first and second MOSFET switching elements; and
switching on the thyristor after switching off the second MOSFET switching element, such that the current initially flows through the second body diode before being commutated to flow substantially only through the thyristor.

7. The method according to claim 6 wherein the second MOSFET switching element comprises a plurality of series-connected MOSFETs.

8. A controller for controlling the operation of a VSC, wherein the VSC comprises:
a first MOSFET switching element including a first body diode;
a second MOSFET switching element including a second body diode, the second MOSFET switching element being connected in series with the first MOSFET switching element, the first and second MOSFET switching elements comprising silicon carbide MOSFETs; and
a protection device, comprising a thyristor, connected in parallel with the second MOSFET switching element,
wherein the controller is configured to perform the operations of the method of claim 6.

9. The method according to claim 6, wherein:
the first MOSFET switching element comprises:
a first silicon carbide MOSFET;
a second silicon carbide MOSFET;
the first body diode, connected to the first silicon carbide MOSFET;
a third body diode, connected to the second silicon carbide MOSFET;
a first storage element connected in parallel with the first silicon carbide MOSFET; and
a second storage element connected in parallel with the second silicon carbide MOSFET; and
the second MOSFET switching element comprises:
a third silicon carbide MOSFET;
a fourth silicon carbide MOSFET;
the second body diode, connected to the third silicon carbide MOSFET;
a fourth body diode, connected to the fourth silicon carbide MOSFET;
a third storage element connected in parallel with the third silicon carbide MOSFET; and
a fourth storage element connected in parallel with the fourth silicon carbide MOSFET.

* * * * *